United States Patent [19]

Stoll et al.

[11] 4,048,192

[45] Sept. 13, 1977

[54] WATER-DILUTABLE TETRAPOLYMERS OF VINYL ACETATE, MALEIC DIESTERS, CROTONIC ACID AND HYDROPHILIC UNSATURATED COPOLYMERIZABLE ESTERS

[75] Inventors: Alois Stoll; Eduard Bergmeister, both of Burghausen, Germany

[73] Assignee: Wacker-Chemie GmbH, Munich, Germany

[21] Appl. No.: 627,103

[22] Filed: Oct. 30, 1975

[30] Foreign Application Priority Data

Nov. 12, 1974 Germany .............................. 2453655

[51] Int. Cl.$^2$ .......................... C08F 4/32; C08F 20/04; C08F 22/04

[52] U.S. Cl. ...................... 260/33.4 R; 260/29.6 TA; 260/63 UY; 260/79.3 M; 424/47; 526/15; 526/49; 526/73; 526/75; 526/80; 526/81; 526/208; 526/230; 526/240; 526/317; 526/325

[58] Field of Search ................ 526/317, 230, 318, 1 S, 526/1 M, 49, 81, 208, 227, 332, 229, 325, 75, 240; 260/29.6 TA, 79.3 M, 33.4 R, 63 UY; 424/47

[56] References Cited

U.S. PATENT DOCUMENTS

| | | | |
|---|---|---|---|
| 3,231,534 | 1/1966 | Blades et al. | 260/29.6 TA |
| 3,342,765 | 9/1967 | Ousterhof et al. | 260/29.6 TA |
| 3,455,887 | 7/1969 | Levine | 260/29.6 TA |
| 3,503,916 | 3/1970 | Warson et al. | 260/29.6 TA |
| 3,577,517 | 5/1971 | Kubot et al. | 424/47 |
| 3,716,633 | 2/1973 | Viout et al. | 424/47 |
| 3,723,616 | 3/1973 | Erlemann et al. | 526/318 |
| 3,810,977 | 5/1974 | Levine et al. | 424/47 |
| 3,925,542 | 12/1975 | Viout et al. | 526/317 |

FOREIGN PATENT DOCUMENTS

860,677  2/1961  United Kingdom

*Primary Examiner*—Herbert J. Lilling
*Attorney, Agent, or Firm*—Hammond & Littell

[57] ABSTRACT

A vinyl acetate copolymerizate of monomers being a free-radical polymerized copolymerizate having monomer units consisting essentially of a. from 60% to 80% by weight of vinyl acetate units,
b. from 10% to 20% by weight of units of a maleic acid diester with a straight-chained alkanol-1 having from about 8 to 10 carbon atoms,
c. from 5% to 20% by weight of units of a monoolefinically unsaturated ester having from 6 to 8 carbon atoms and a hydrophilic group, and
d. from 3% to 10%, particularly 7%, by weight of crotonic acid; as well as an alcoholic solution thereof and salts thereof.

10 Claims, No Drawings

WATER-DILUTABLE TETRAPOLYMERS OF VINYL ACETATE, MALEIC DIESTERS, CROTONIC ACID AND HYDROPHILIC UNSATURATED COPOLYMERIZABLE ESTERS

RELATED ART

Many copolymers of vinyl acetate with various acids and/or esters are known. These include, for example, copolymers of vinyl acetate, a maleic acid ester, and/or crotonic acid; copolymers of vinyl acetate, crotonic acid, and a vinyl ester of a linear or branched, long-chain fatty acid; and copolymers of vinyl acetate, crotonic acid, an acrylate or methacrylate ester, and/or an alkyl vinyl ether [c.f. German Specifications Nos. (DAS) 1,645,082, (DOS) 1,745,214, and (DOS) 2,138,269]. Such prior art copolymers are generally soluble in alcohols, and the resulting alcoholic solutions can, after complete or partial neutralization of the acidic components of the copolymer, depending on the quantity of the said components, be diluted with water. The amount of water that can be added to the alcoholic solutions without causing turbidity is, however, generally limited.

The hydrophilic properties of the above copolymers may be influenced to some extent, by the proportion of crotonic acid in the copolymers, that is to say, that an increase in the crotonic acid content may result in an improvement in the hydrophilic properties of the copolymers. This improvement cannot, however, always be achieved in practice, because copolymers having a high crotonic acid content are difficult to produce industrially without discoloration and without some residual monomer content.

OBJECTS OF THE INVENTION

An object of the present invention is the development of copolymerizates of vinyl acetate which are soluble in alcoholic solution and, after complete or partial neutralization, said alcoholic solutions are completely or partially miscible with water.

Another object of the present invention is the development of a vinyl acetate copolymerizate of monomers being a free-radical polymerized copolymerizate of monomer units consisting essentially of a. from 60% to 80% by weight of vinyl acetate units, b. from 10% to 20% by weight of units of a maleic acid diester with straight-chained primary alcohols selected from the group consisting of n-octanol-1, n-decanol-1 and mixtures thereof, c. from 5% to 20% by weight of units of a mono-olefinically unsaturated ester copolymerizable with vinyl acetate and having from 6 to 8 carbon atoms and a hydrophilic group selected from the group consisting of carboxyl groups, hydroxyl groups and keto groups, and d. from 3% to 10% by weight of crotonic acid units; and the salts thereof.

A further object of the invention is the development of alcoholic solutions of the above vinyl acetate copolymerizates with water-miscible alcohols.

These and other objects of the present invention will become more apparent as the description thereof proceeds.

DESCRIPTION OF THE INVENTION

The present invention provides a free-radical polymerized copolymer comprising a. from 60% to 80% by weight of vinyl acetate units, b. from 10% to 20% by weight of units of a maleic acid diester with a straight-chain alkanol-1 having 8 or 10 carbon atoms or with a mixture of such alkanols, c. from 5% to 20% by weight of units of a mono-olefinically unsaturated ester having 6, 7 or 8 carbon atoms and having a hydrophilic group, and d. from 3% to 10%, preferably 7%, by weight of crotonic acid units. The invention also provides salts of such copolymers.

More particularly, the present invention relates to a vinyl acetate copolymerizate of monomers being a free-radical polymerized copolymerizate of monomer units consisting essentially of a. from 60% to 80% by weight of vinyl acetate units, b. from 10% to 20% by weight of units of a maleic acid diester with straight-chained primary alcohols selected from the group consisting of n-octanol-1, n-decanol-1 and mixtures thereof, c. from 5% to 20% by weight of units of a mono-olefinically unsaturated ester copolymerizable with vinyl acetate and having from 6 to 8 carbon atoms and a hydrophilic group selected from the group consisting of carboxyl groups, hydroxyl groups and keto groups, and d. from 3% to 10% by weight of crotonic acid units; and the salts thereof; together with alcoholic solutions thereof with water-miscible alcohols.

These copolymers and their salts are soluble in alcoholic solutions, and such solutions can — after complete or partial neutralization — surprisingly, be diluted with water to a relatively large extent. In some cases, the alcoholic solutions are miscible with water in all proportions.

The ratio of the four comonomers as specified above is important for those solubility properties of the copolymers. The presence of the maleic acid diester with a straight chain alkanol-1 having 8 and/or 10 carbon atoms also appears to be important, since if this ester is replaced by, for example, dibutyl maleate, di-2-ethyl-hexyl maleate, vinyl laurate, vinyl stearate, or vinyl isononoate, the resulting copolymer has poorer solubility. The presence of component (c) is also important and cannot be replaced by, for example, more crotonic acid without deterioration in the solubility of the copolymer, notwithstanding that both components are hydrophilic.

Component (b) of the copolymer according to the invention consists of units of a maleic acid diester preferably with an Alfol® alcohol having 8 or 10 carbon atoms or with a mixture of such alcohols. These diesters may be manufactured from maleic acid and an Alfol® alcohol having 8 to 10 carbon atoms or a mixture of such alcohols, such as Alfol-8®, Alfol-10® and Alfol 810®. Alfol® alcohols are alcohols produced industrially by the polymerization of ethylene on aluminum to give an aluminum alkylene, with subsequent oxidation to give an aluminum alkoxide, and then hydrolysis to form an alcohol. They are primarly straight-chained, aliphatic alcohols and are in the form of colorless liquids. The alcohols with a chain length of 8 or 10 carbon atoms or mixtures thereof are used according to the invention. However, other normal or straight-chained primary alkanols having 8 or 10 carbon atoms can be used for esterification of maleic acid, such as n-octanol-1, n-decanol-1 and mixtures thereof.

Component (c) consists of units of one or more mono-olefinically unsaturated esters copolymerizable with vinyl acetate and having 6 to 8 carbon atoms and a hydrophilic group. The hydrophilic group is advantageously a hydroxy or carboxy group, but may be another hydrophilic group, for example, a keto group. It may be attached to either the alcohol or acid moiety of the ester. The double bond may also be in either the acid or alcohol moiety of the ester. Examples of such esters are monoalkyl maleates having 6 to 8 carbon atoms, e.g., monoethyl maleate and monobutyl maleate; hydroxyalkyl acrylates having 6 to 8 carbon atoms, e.g., hydroxypropyl acrylate and hydroxybutyl acrylate; and hydroxyalkyl methacrylates, e.g., hydroxypropyl methacrylate. Mixtures of such esters may also be used.

Component (d), namely, crotonic acid units, is advantageously present in an amount of from 3% to 7% by weight.

The copolymers of the invention may be manufactured by conventional polymerization methods, for example, in bulk, in solution, in suspension, or in emulsion. Each of the monomers (a) to (d) may be wholly introduced into the polymerization medium prior to the commencement of polymerization, or may be wholly metered in during polymerization, or may be partially introduced initially and partially metered in.

Polymerization may be initiated by a free-radical-forming initiator or polymerization catalyst, which may be either water-soluble or monomer-soluble depending on the type of polymerization. Suitable free-radical-forming initiators are those that are suitable for initiating the homopolymerization of vinyl acetate, and especially peroxy compounds for example, diacyl peroxides, e.g., diacetyl peroxide, dilauroyl peroxide, and dibenzoyl peroxide; per esters, for example, peresters of branched alcohols with linear or branched fatty acids, e.g., tert.-butyl peroctoate, tert.-butyl perpivalate, and tert.-butyl perisononoate; di-tert.-butyl peroxide; dialkyl peroxydicarbonates; and water-soluble peroxy compounds, e.g., hydrogen peroxide, sodium persulfate, potassium persulfate, ammonium persulfate, and tert.butyl hydroperoxide.

When using a monomer-soluble peroxy compound, it can be advantageous additionally to use 2,2-bis-(tert.-butylperoxy)-butane. Mixtures of two or more peroxy compounds may be used. These peroxy compounds may, optionally, be used together with reducing agents in a redox system. Suitable reducing agents are, for example, formaldehyde, sodium sulfoxylate, iron-II salts, sodium dithionite, sodium bisulfite, sodium sulfite, sodium thiosulfate, and a palladium sol with hydrogen.

The amount of initiator used is suitably within the range of from 0.01% to 1% by weight, preferably from 0.1% to 0.6% by weight, calculated relative to the total weight of monomers. The amount of reducing agent used, if any, is suitably from 0.01% to 1% by weight, calculated relative to the total weight of monomers.

The initiators may be wholly introduced initially into the polymerization mix or may be wholly or partially metered in.

Polymerization is advantageously carried out at a temperature of from 30° to 140° C, preferably from 50° to 120° C. It is normally carried out under atmospheric pressure, suitably in a vessel provided with a stirrer, with heating means and cooling means, and optionally, with a reflux condenser.

The degree of polymerization may be adjusted within a wide range, in known manner, by means of a molecular-weight regulator, for example, an aldehyde, such as a lower alkanal, for example, acetaldehyde, propionaldehyde, and butyraldehyde; and aliphatic chlorohydrocarbon having 2 to 4 carbon atoms, a mercaptan, such as a lower alkanethiol, a lower aliphatic alcohol, such as a lower alkanol; or a lower aliphatic ester, such as a lower alkyl lower alkanoate. These regulators are suitably used in amounts of from 0.1% to 2.0% by weight, calculated relative to the total weight of monomer. By suitable use of molecular weight regulators, products having K-values within the range of from 20 to 70 can generally be obtained. The K-value is a measure of the degree of polymerization, and is calculated from the relative viscosity of the product. The K-values given herein are calculated from the relative viscosities as determined in a 1% by weight solution in acetone at 20° C with a Ubbelohde capillary viscometer (Fikentscher, Cellulosechemie 13, 1932, pp. 58 ff).

A preferred method for the manufacture of the copolymers according to the invention is by bulk polymerization in the presence of a monomer-soluble peroxy compound, especially a dialkyl peroxidicarbonate, and of a molecular-weight regulator at a temperature of from 30° to 140° C.

When the copolymers according to the invention are manufactured by emulsion or suspension polymerization, this is carried out in an aqueous phase in the presence of an emulsifier and/or a protective colloid, which are suitably used in the amounts used for the homopolymerization of vinyl acetate. The preferred polymerization temperature in this case is from 30° to 100° C. 20

The copolymers according to the invention may be neutralized, or partially neutralized, by means of either an organic or an inorganic base to obtain the corresponding salts. Preferably, before neutralization or partial neutralization, the copolymers accoring to the invention are dissolved in at least one water-miscible organic solvent, such as the water-miscible lower alkanols, water-miscible lower alkanediols, water-miscible lower alkoxy lower alkanols, water-miscible lower alkoxyethoxyethanols, water-miscible polyoxylower alkyleneglycols, water-miscible lower alkanones, etc. Suitable inorganic bases for neutralization are the alkali metal hydroxides, such as sodium hydroxide and potassium hydroxide preferably in solution, for example, in a lower alkanol, or ammonia. Suitable organic bases are amines, preferably having from 2 to 8 carbon atoms and optionally substituted by a hydroxy group (namely, amino alcohols). These are amines having from 2 to 8 carbon atoms selected from the group consisting of alkylamines, alkylolamines, alkylenediamines, dialkylenetriamines, alkylaminoalkanols, aminoalkyleneglycols, etc., for example, dimethylamine, ethylamine, diethylamine, aminoethylamine, ethanolamine, isopropanolamine, 2-amino-2-methyl-propan-1-ol, 2-amino-2-methyl-propane-1,3-diol, and diethylaminoethanol. Mixtures of two or more bases can be used. For the neutralization, or partial neutralization, of the copolymers, the bases are generally used in amounts of from 50% to 150% of the amount theoretically required for complete neutralization.

The copolymers according to the invention and their salts can be used for a variety of industrial purposes, in the same manner as the known hydrophilic vinyl acetate copolymers. Alcoholic solutions of the copolymers, particularly with ethanol or isopropanol, are, in many cases — after complete or partial neutralization with an alkali, an amine, or an amino alcohol — miscible in all or most proportions with water. This property makes the copolymers particularly useful in the manufacture of, for example, water-soluble lacquers. The copolymers are also soluble in conventional lacquer solvents. The copolymers can produce clear resilient films which are not sticky and have a low hygroscopicity. These films adhere well to paper, wood, metal, glass, leather and other substrates.

The following examples illustrate the invention without being limitative.

EXAMPLES

The amounts of peroxy compounds given in grams in the Examples are the amounts of a 20% solution of the respective compounds.

EXAMPLE 1

250 gm of vinyl acetate, 46 gm of di-Alfol-810® maleate, 10 gm of monobutyl maleate, 8 gm of crotonic acid, 9.5 gm of acetaldehyde, and 1 gm of diisopropyl peroxydicarbonate, were introduced into a 2-liter reaction vessel fitted with a stirrer, reflux condenser, and nitrogen inlet-tube. Alfol-810® is a mixture of predominantly n-octanol-1 and n-decanol-1. The mixture was heated, with stirring, while passing a slight stream of nitrogen, unitl reflux commenced (64° C). Ten minutes after the commencement of reflux, the dosing in of a mixture of 334 gm of vinyl acetate, 50 gm of di-Alfol-810® maleate, 70 gm of monobutyl maleate, 32 gm of crotonic acid, and 4 gm of diisopropyl proxydicarbonate was started. The dosing in was at a steady rate and was complete after five hours, during which time the temperature was maintained at 64° C. Polymerization was then continued for a further 2 to 2½ hours, during which time the temperature was gradually raised to 82° C. During this time also, a 1-gm portion of diisopropyl peroxydicarbonate was added every 30 minutes. The cessation of reflux indicated the end of the reaction. The small residue of monomers was distilled off to leave a clear colorless copolymer melt.

The copolymer had the following weight composition:
  vinyl acetate — 73%
  di-Alfol-810® maleate — 12%
  monobutyl maleate — 10%
  crotonic acid — 5%

It had a K-value of 30 (determined as indicated above) and an acid number of 68 mg KOH/gm. An 8% by weight solution of the copolymer in isopropanol was miscible with water in almost all proportions after first neutralizing 90% of the hydrophilic groups with 2-amino-2-methyl-propane-1,3-diol.

EXAMPLE 2

Polymerization was carried out in an analogous manner to Example 1. 250 gm of vinyl acetate, 60 gm of di-Alfol-810® maleate, 16 gm of monobutyl maleate, 20 gm of crotonic acid, 6.5 gm of acetaldehyde, and 1 gm of diisopropyl peroxydicarbonate were initially introduced, and were heated until reflux commenced (68° C). After 10 minutes, the remainder of the components were dosed in over a period of 5 hours. These consisted of 334 gm of vinyl acetate, 60 gm of di-Alfol-810® maleate, 24 gm of monobutyl maleate, 36 gm of crotonic acid, and 5 gm of diisopropyl peroxydicarbonate.

The product was a clear colorless polymer of the following composition:
  vinyl acetate — 73%
  di-Alfol-810® maleate — 15%
  monobutyl maleate — 5%
  crotonic acid — 7%

It had a K-value of 37, and an acid number of 63.4 mg KOH/gm. A 10% by weight solution of the copolymer in ethanol became completely clear after the addition of 0.5% by weight of water. After 80% neutralization with ammonia, it could be diluted with water as desired.

EXAMPLE 3

Polymerization was again carried out analogously to Example 1. 250 gm of vinyl acetate, 50 gm of di-Alfol810® maleate, 10 gm of hydroxypropyl acrylate, 8 gm of crotonic acid, 5.5 gm of acetaldehyde, and 1 gm of diisopropyl peroxydicarbonate were initially introduced and heated until reflux commenced at about 67° C. After 10 minutes the remainder of the components were dosed in over a period of 6 hours. These consisted of 310 gm of vinyl acetate, 70 gm of di-Alfol-810® maleate, 70 gm of hydroxypropyl acrylate, 32 gm of crotonic acid and 4 gm of diisopropyl peroxydicarbonate. Two and one-half hours after completion of the dosing in, at an inner temperature of 90° C, polymerization was terminated.

The colorless clear copolymer obtained had the following weight composition:
  vinyl acetate —70%
  di-Alfol-810® maleate — 15%
  hydroxypropyl acrylate — 10%
  crotonic acid — 5%

It had a K-value of 36 and an acid number of 35 mg KOH/gm. An 8% by weight solution of the copolymer in isopropanol could be diluted with water to an almost unlimited extent after 90% neutralization with diethylamino ethanol.

EXAMPLE 4

Polymerization was again carried out as in Example 1. 220 gm of vinyl acetate, 30 gm of di-Alfol810® maleate, 20 gm of monobutyl maleate, 10 gm of crotonic acid, 1.6 gm of acetaldehyde, and 1 gm of diisopropyl peroxydicarbonate were initially introduced. Ten minutes after reflux had begun at a temperature of 65° C, the remainder of the components were dosed in over a period of 5 hours. These consisted of 284 gm of vinyl acetate, 50 gm of di-Alfol-810® maleate, 140 gm of monobutyl maleate, 46 gm of crotonic acid, and 4 gm of diisopropylperoxydicarbonate. Polymerization was complete 3 hours after the completion of the introduction of the monomers when the temperature had reached 85° C.

The clear colorless polymer had the following weight composition:
  vinyl acetate — 63%
  di-Alfol-810® maleate — 10%
  monobutyl maleate — 20%
  crotonic acid — 7%

It had a K-value of 52, and an acid number of 113 mg KOH/gm. A 15% by weight solution of this product in isopropanol could be diluted with water as desired after 90% neutralization with 2-amino-2-methyl-propane1,3-diol.

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. A vinyl acetate copolymerizate of monomers being a free-radical polymerized copolymerizate having monomer units consisting essentially of
    a. from 60% to 80% by weight of vinyl acetate units,
    b. from 10% to 20% by weight of units of a maleic acid diester with straight-chained primary alcohols selected from the group consisting of n-octanol-1, n-decanol-1 and mixtures thereof,
    c. from 5% to 20% by weight of units of a mono-olefinically unsaturated ester copolymerizable with vinyl acetate and having from 6 to 8 carbon atoms and a hydrophilic group selected from the group consisting of carboxyl groups, hydroxyl groups and keto groups, and
    d. from 3% to 10% by weight of crotonic acid units; and the copolymers thereof neutralized by salt forming compounds.

2. The vinyl acetate copolymerizate of claim 1 wherein units of component (d) are present in an amount of from 3% to 7% by weight.

3. The vinyl acetate copolymerizate of claim 1 wherein said maleic acid diester of component (b) is a diester of alcohols produced industrially be polymerization of ethylene on aluminum with subsequent oxidation and hydrolysis.

4. The vinyl acetate copolymerizate of claim 1 wherein said mono-olefinically unsaturated ester copolymerizable with vinyl acetate and having from 6 to 8 carbon atoms of component (c) is selected from the group consisting of monoalkyl maleates, hydroxyalkyl acrylates and hydroxyalkyl methacrylates.

5. The vinyl acetate copolymerizate of claim 1 wherein said salt forming compounds are selected from the group consisting of alkali metal hydroxide, ammonia, and amines having from 2 to 8 carbon atoms selected from the group consisting of alkylamines, alkylolamines, alkylenediamines, dialkylenetriamines, alkylaminoalkanols and aminoalkyleneglycols.

6. A process for the production of the vinyl acetate copolymerizate of claim 1 which consists essentially of heating the monomers in bulk in the presence of an oil-soluble peroxide and a molecular weight regulator at a temperature of from 30° to 140° C for a time sufficient to effect copolymerization and recovering said vinyl acetate copolymerizate.

7. The process of claim 6 wherein said oilsoluble peroxide is a dialkyl peroxydicarbonate employed in amounts of from 0.01% to 1% based on the weight of the monomers.

8. A solution of the vinyl acetate copolymerizate of claim 1 in a water-miscible organic solvent.

9. The solution of claim 8 wherein said watermiscible organic solvent is a water-miscible lower alkanol.

10. The vinyl acetate copolymerizate of claim 1 having a K-value of the range of from 20 to 70.

* * * * *